(12) United States Patent
Chen et al.

(10) Patent No.: US 11,343,193 B2
(45) Date of Patent: May 24, 2022

(54) APPARATUS AND METHOD FOR RATE MANAGEMENT AND BANDWIDTH CONTROL

(71) Applicant: Realtek Singapore Private Limited, Singapore (SG)

(72) Inventors: Charles Chen, San Ramon, CA (US); Donggun Keung, Milpitas, CA (US)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 0 days.

(21) Appl. No.: 16/733,260

(22) Filed: Jan. 3, 2020

(65) Prior Publication Data
US 2021/0211382 A1 Jul. 8, 2021

(51) Int. Cl.
| | |
|---|---|
| *H04L 47/2475* | (2022.01) |
| *H04L 12/28* | (2006.01) |
| *H04L 47/76* | (2022.01) |
| *H04L 49/00* | (2022.01) |
| *H04L 47/80* | (2022.01) |

(52) U.S. Cl.
CPC ...... *H04L 47/2475* (2013.01); *H04L 12/2803* (2013.01); *H04L 47/76* (2013.01); *H04L 47/803* (2013.01); *H04L 49/3018* (2013.01); *H04L 49/3045* (2013.01)

(58) Field of Classification Search
CPC .......... H04L 47/2475; H04L 47/76; H04L 47/803; H04L 49/3018; H04L 49/3045; H04L 12/2803
See application file for complete search history.

(56) References Cited

U.S. PATENT DOCUMENTS

| | | | | |
|---|---|---|---|---|
| 7,502,366 B1* | 3/2009 | Erimli | ...................... | H04L 47/20 370/389 |
| 7,668,177 B1* | 2/2010 | Trapp | ...................... | H04L 47/50 370/395.42 |
| 8,521,889 B2* | 8/2013 | Anschutz | .............. | H04L 47/762 709/228 |
| 2008/0196033 A1* | 8/2008 | Chen | ..................... | H04L 49/205 718/103 |

(Continued)

OTHER PUBLICATIONS

Ghanwani et al. (RFC 2816, "A Framework for Integrated Services Over Shared and Switched IEEE 802 LAN Technologies", May 2000 (Year: 2000).*

*Primary Examiner* — Jerry B Dennison
(74) *Attorney, Agent, or Firm* — McClure, Qualey & Rodack, LLP

(57) ABSTRACT

A data rate management system that provides quality of service at the fine granularity of applications in the home network and home automation environment is provided. An application can be associated with a dynamic traffic flow, a physical port, a logical interface, or a host computer or device. Virtual queueing is applied to isolate and protect individual applications. Comprehensive rate management algorithms are developed to offer the bandwidth guarantee for the applications individually. The data rate management system includes a traffic classifier, virtual queueing, and a rate manager. The traffic classifier can statically or dynamically identify an application. The identified application is stored in a dedicated virtual queue. The rate manager schedules the packet transmission among virtual queues using the application-based traffic profiles.

18 Claims, 4 Drawing Sheets

(56) References Cited

U.S. PATENT DOCUMENTS

| | | | |
|---|---|---|---|
| 2011/0176551 A1* | 7/2011 | Chawla | H04L 41/0813 370/395.31 |
| 2013/0046863 A1* | 2/2013 | Bastian | H04L 47/2483 709/220 |
| 2014/0089914 A1* | 3/2014 | Kay | G06F 8/61 717/176 |
| 2017/0187640 A1* | 6/2017 | Vasudevan | H04L 49/9068 |

* cited by examiner

APPARATUS AND METHOD FOR RATE MANAGEMENT AND BANDWIDTH CONTROL

BACKGROUND OF THE INVENTION

1. Field of the Invention

The invention is concerned with data rate management that is application aware and manageable by the end user in the digital home networking and/or home automation environment.

2. Description of the Prior Art

A traffic scheduler, also called packet scheduler, queueing discipline, or queueing algorithm, is an arbiter on a network device in a packet switching communication network. It manages the sequence of data packets in the transmit and receive queues of the network interface. The traffic scheduler logic decides which data packet to forward next. The traffic scheduler is associated with a queuing system, storing the data packets temporarily until they are transmitted.

Conventionally, network devices 100 have eight queues, each storing the packets of one priority, as defined in the IEEE 802.1Q standards and the IETF Differentiated Services or DiffServ standards. As shown in FIG. 1, the incoming traffic packets are stored in one of the eight priority queues 120 (Queue 0-Queue 7), based on the traffic priority information carried in the packet or the result of traffic classification. The traffic scheduler 110 is to decide which queue 120 should be served when the outgoing interface is ready for transmission. Those packets stored in the same priority queue will be transmitted in the order they were received or simply first in and first out (FIFO) operation. A few scheduling algorithms have been developed and deployed in the network element. For instance, a simple strict priority algorithm attempts to transmit the packets in the strict order of priority.

In a current or future home-networking environment, more and more networking devices and applications are being introduced as a result of multimedia services from Internet service and content providers and home automation from Internet of Things (IoT) devices. Due to the limited bandwidth constraint from the home to the Internet, it is becoming increasingly important to provide bandwidth allocation or data rate control based on the applications. The conventional eight priority queues are simply not enough to achieve the goal.

SUMMARY OF THE INVENTION

An application-aware rate management and bandwidth control system comprises a traffic classifier configured to classify inbound data traffic by a plurality of specific applications, a plurality of application virtual queues, each virtual queue uniquely associated with one of the plurality of specific applications and configured to store inbound data traffic classified by the traffic classifier as corresponding to the one specific application, a plurality of default priority queues, each default priority queue uniquely associated with a specific priority and configured to store inbound data traffic not classified by the traffic classifier as corresponding to a specific application, and a data rate manager configured to allocate outbound rate and bandwidth control for data packets stored in the application virtual queues and default priority queues using application based traffic profiles.

A proposed home router comprises at least one LAN port and/or at least one Wi-Fi port, at least one WAN port, a traffic classifier configured to classify inbound data traffic from the LAN and/or Wi-Fi port by a plurality of specific applications, a plurality of application virtual queues, each virtual queue uniquely associated with one of the plurality of specific applications and configured to store inbound data traffic classified by the traffic classifier as corresponding to the one specific application, a plurality of default priority queues, each default priority queue uniquely associated with a specific priority and configured to store inbound data traffic not classified by the traffic classifier as corresponding to a specific application, and a data rate manager coupled to the virtual queues, the default priority queues, and the WAN port and configured to allocate outbound rate and bandwidth control for data packets stored in the application virtual queues and default priority queues using application based traffic profiles.

A method of rate management and bandwidth control in a system is also proposed. The method comprising classifying inbound data traffic by a plurality of specific applications, storing inbound data traffic classified by the traffic classifier into one of a plurality of application virtual queues, each virtual queue uniquely associated with one of the plurality of specific applications, storing inbound data traffic not classified by the traffic classifier into one of a plurality of default priority queues, each default priority queue uniquely associated with a specific priority, and allocating outbound rate and bandwidth control for data packets stored in the application virtual queues and default priority queues using application based traffic profiles, wherein the traffic profiles have committed information rate and peak information rate.

These and other objectives of the present invention will no doubt become obvious to those of ordinary skill in the art after reading the following detailed description of the preferred embodiment that is illustrated in the various figures and drawings.

DETAILED DESCRIPTION

One objective of the invention is to provide a novel data rate management system that can provide rate control and regulation at the granularity of applications. The system comprises an application classification, virtual queueing, and a rate manager. It can control and manage the data rate for an identified and individual application. An application is defined broadly and can be associated with a dynamic traffic flow, a physical port, a logical interface or a host computer or a device. The rate manager is configured with rate scheduling algorithms, which ensure the rate guarantee, fairness, and quality of service for applications at large.

The invention provides quality of service at the fine granularity of applications in the home network and home automation environment. As stated, an application can be associated with a dynamic traffic flow, a physical port, a logical interface, or a host computer or a device or any combination of these associations according to specific embodiments. Virtual queueing is applied to isolate and protect individual applications. Comprehensive rate management algorithms are developed to offer the bandwidth guarantee for the applications individually. The invention includes the traffic classifier, the virtual queueing, and the rate manager. The traffic classifier can statically or dynamically identify an application. Data packets associated with the identified application are stored in a dedicated virtual queue. Each specific application is assigned to a dedicated one of the plurality of application virtual queues. The rate manager schedules the packet transmission among the virtual queues using the application-based traffic profiles.

Figure 1:
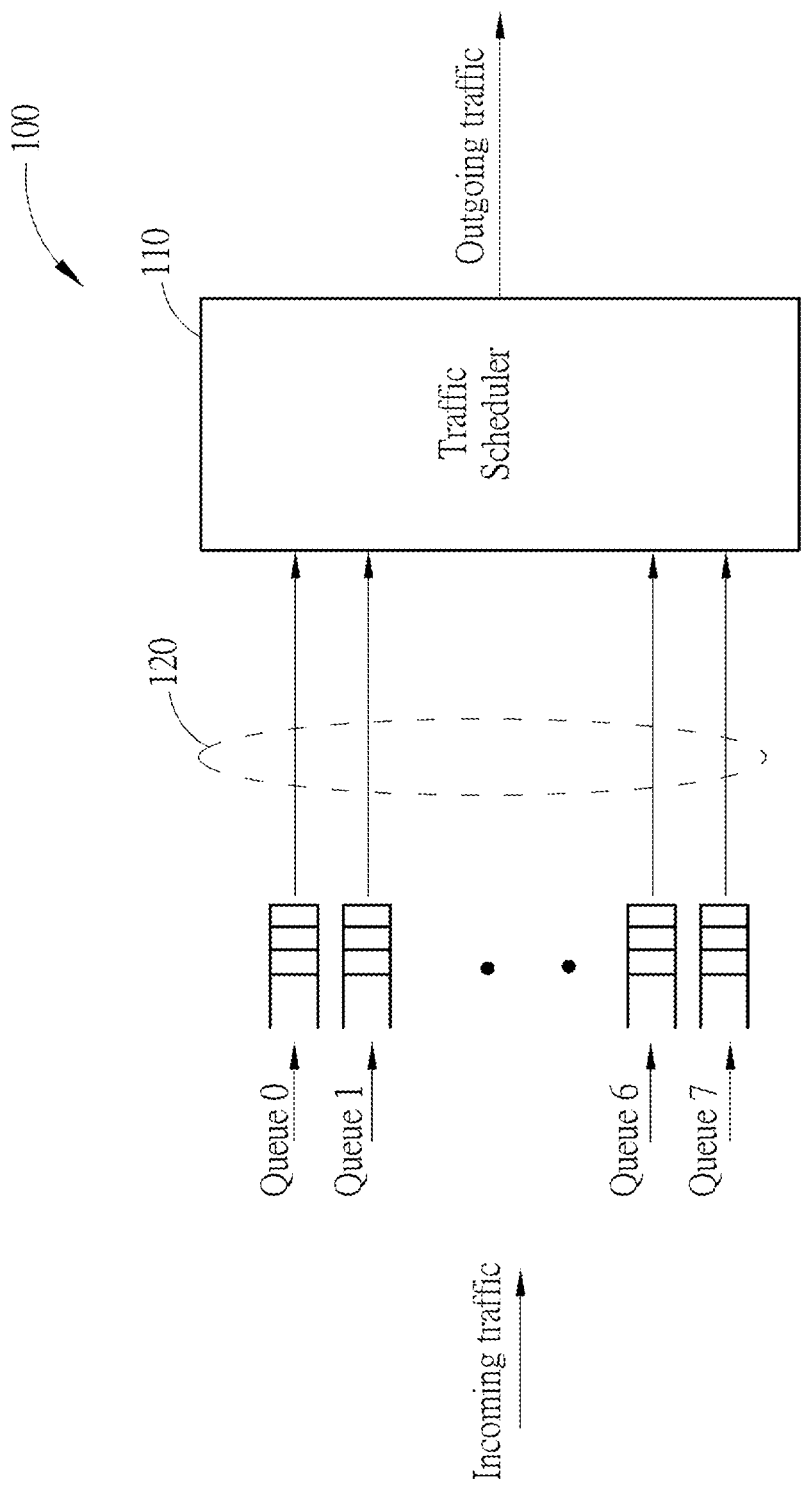
FIG. 1 illustrates data rate management according to the prior art.
Figure 2:
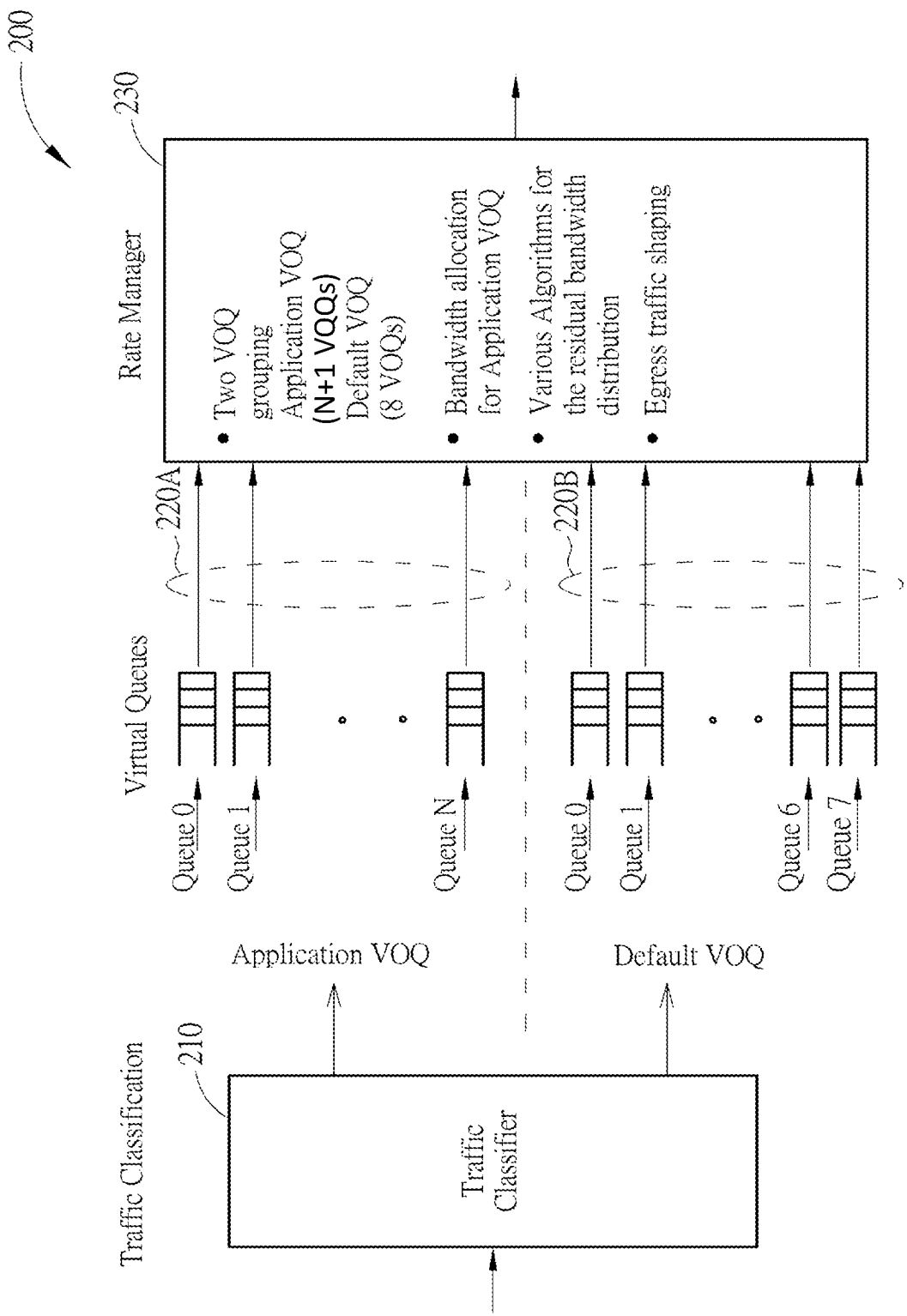
FIG. 2 shows an overview of an example data rate management system according to the present invention.

The implementation of the invention is a system 200 comprising the traffic classifier 210, the virtual queues 220A, 220B, and the rate manager 230 as shown in FIG. 2.

At the first stage is the traffic classifier 210 that classifies the incoming packet and determines which virtual queue 220A, 220B it will be stored in the second stage. The traffic classifier 210 is configurable by the end user with classification rules. In general, each rule uniquely identifies an application, where the traffic classifier 210 classifies inbound data traffic by a plurality of specific applications to generate at least one classified inbound data traffic and at least one unclassified inbound data traffic.

The second stage is the virtual queuing 220A, 220B, which stores the packet into a queue 220A, 220B, based on the classification result of the first stage. The packets identified with an application are stored in a corresponding application virtual queue 220A. There are N application virtual queues 220A. In one practical implementation, the value of N is 256, although N could be any positive integer depending upon design considerations. Traffic with no rule match in the traffic classifier 210, meaning unclassified or not classified inbound data traffic, is stored in the default virtual queues 220B.

The last stage is the rate manager 230 that is responsible for the rate or bandwidth allocation algorithm among virtual queues 220A, 220B.

Traffic Classifier

Traffic classification rules are used classify traffic onto an application virtual queue 220A, uniquely identified by an application virtual queue id 0-N, based on data patterns in each incoming packet. A home router hardware monitors and inspects every incoming packet, arriving at each LAN (local area network) port, and assigns an application virtual queue id Queue 0-Queue N to each packet (0≤application id<N) based on a matching classification rule. A user can use ISO layer 2 (L2) to layer 7(L7) fields in a packet header, data patterns in packet payload, as well as incoming LAN port id for classification rule lookup.

In a typical implementation, the inputs and output of the classification engine are as follows:

Inputs:
Any incoming packet header fields selected by user (L2 destination address, L2 source address, . . . )
Data patterns in packet payload
Incoming LAN port ID
Output:
Application virtual queue id 0-N, which is used to identify the application virtual queue Queue 0-Queue N for egress queueing.
An application virtual queue id 0-N is selected by a user based on desired traffic behavior.

In case an incoming packet fails to match any of the user configured classification rules, the packet will be enqueued to one of the eight default application virtual queues 220B based on priority values embedded in L2 or L3 header.

Virtual Queues

One virtual queue is created for each configured application at the WAN (wide area network) port.

A virtual queue id implies the latency tolerance level of the associated application.

Virtual queue 0 is used for application(s) with the lowest latency tolerance.

Virtual queue N is used for application(s) with highest latency tolerance.

A default application is created for traffic that does not match any of the user configured traffic classification rules The default application is configured with 8 virtual queues 220B. Traffic for default application is enqueued based on DSCP or 802.1Q PCP bits.

Rate Manager

Total LAN to WAN bandwidth (WANBW) is configured at the home gateway WAN port by the ISP based on an SLA (Service Level Agreement).

The rate manager 230 is responsible for scheduling traffic onto the WAN port based on the ISP SLA and rate manager configurations and the a data rate manager 230 is coupled to the virtual application queues, the default priority queues, and the WAN port. The data rate manager 230 is configured to allocate at least one of outbound rate and/or bandwidth control for data packets stored in the application virtual queues and default priority queues using application based traffic profiles. In other words, in some embodiments, the data rate manager 230 is configured to allocate only the outbound rate for the data packets, in other embodiments the data rate manager 230 is configured to allocate only the bandwidth control for the data packets, while in still other embodiments the data rate manager 230 is configured to allocate both the outbound rate and the bandwidth control for the data packets. Furthermore, the data rate manager 230 may also be configured to output data packets stored in the application virtual queues and default priority queues according to the allocated at least one of outbound rate and/or bandwidth control. In other words, in some embodiments, the data rate manager 230 is configured to output the data packets only according to allocated outbound rate, in other embodiments, the data rate manager 230 is configured to output the data packets only according to allocated bandwidth control, while in still other embodiments the data rate manager 230 is configured to output the data packets according to both the allocated outbound rate and the allocated bandwidth control. In embodiments comprising a WAN port, the data rate manager 230 may be configured to output the data packets to the WAN port.

The rate allocation algorithm design needs to take into consideration:
Rate guarantee
Fairness
Latency tolerance
Starvation
Rate limiting/policing with congestion marking
Each application is configured with a traffic profile, which has the committed information rate (CIR), and peak information rate (PIR).

The behavior of the rate manager is completely programmable.

The algorithm below suggests one way the rate manager can be programmed.

Referring to FIG. 2, the rate manager 230 retrieves the total bandwidth available on WAN port, WANBW, configured by the ISP. Then the rate manager 230 retrieves the application CIR and PIR for each application, APPCIR, APPPIR, configured by the user. The rate manager 230 sets up a token bucket for each application virtual queue Application VOQ based on $APP_{i,CIR}$, where 0≤i<N. The rate manager 230 sets up a token bucket for default virtual queues Default VOQ based on DEFAULTCIR.

The rate manager 230 goes through all configured applications, and sends LAN to WAN traffic for each application based on the $APP_{i,CIR}$.

After $APP_{i,CIR}$ traffic is sent for all configured applications, the rate manager 230 sends CIR on default virtual queues 220B.
DEFAULTCIR The rate manager 230 schedules traffic on default virtual queues based on SP or DRR.

The rate manager 230 calculates residual bandwidth according to equ. 1.

$$R_{BW} = WAN_{BW} - ((\Sigma_{k=0}^{N} APP_{k,cir}) + DEFAULT_{CIR}) \quad \text{(equ. 1)}$$

If $R_{BW} > 0$, the rate manager 230 distributes the residual bandwidth as follows:
Residual bandwidth is distributed among applications based on ratio of configured $APP_{i,PIR}$.

$$APP_{i,RBW} = R_{BW} * APP_{i,PIR} / ((\Sigma_{k=0}^{N} APP_{k,pir}) + DEFAULT_{PIR})$$

$$DEFAULT_{RBW} = R_{BW} * DEFAULT_{PIR} / ((\Sigma_{k=0}^{N} APP_{k,pir}) + DEFAULT_{PIR})$$

The rate manager 230 sets up a token bucket for each application virtual queue 220A based on $APP_{i,RBW}$. The rate manager 230 sets up a token bucket for default virtual queues 220B based on $DEFAULT_{RBW}$.

The rate manager 230 goes through all configured applications, and send LAN to WAN traffic for each application based on the $APP_{i,RBW}$.

After APPi, RBW traffic is sent for all configured applications, the rate manager 230 sends traffic on default virtual queues 220B.
$DEFAULT_{RBW}$ The rate manager 230 schedules traffic on default virtual queues 220B based on SP (Strict Priority) or DRR (Deficit Round Robin). When configuring the rate manager, a user must ensure equ. 2 is satisfied.

$$((\Sigma_{k=0}^{N} APP_{k,cir}) + DEFAULT_{CIR}) <= WAN_{BW} \quad \text{(equ. 2)}$$

Figure 3:
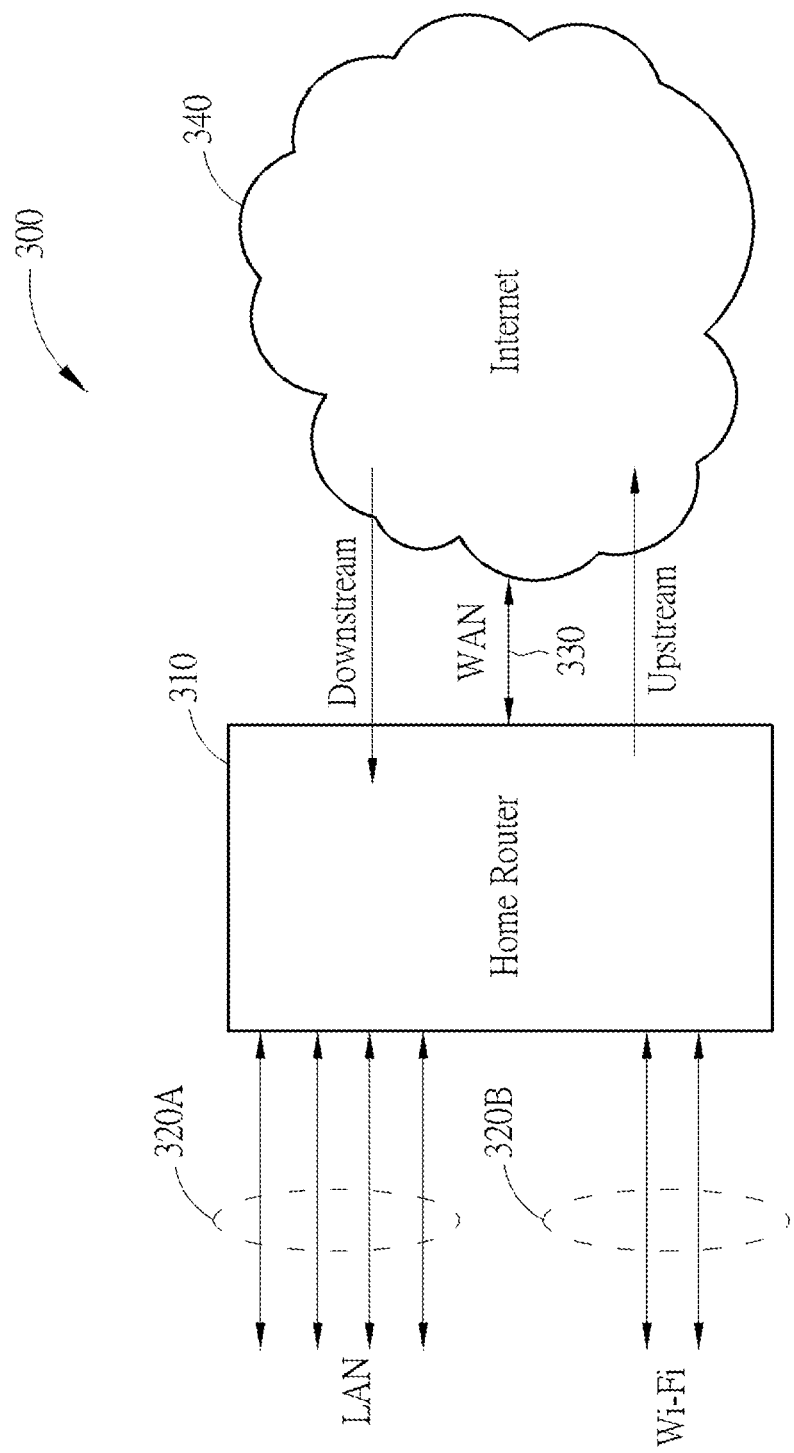
FIG. 3 shows an example home router connectivity according to the present invention.

For the case where $R_{WB} = 0$, no residual bandwidth is available at WAN for distribution. However, for each configured application, $APP_{i,CIR}$ is guaranteed.
Home Router Implementation The proposed application-aware rate management system is generally applied to the ends of the Internet such as the home router in a residential home, where the Internet traffic is generated and terminated. It is the effective place to differentiate the Internet applications using the rate management system 300 described in the invention. The home router 310 as shown in FIG. 3 is the gateway to the Internet 340 and provides the Internet access. There are generally wired connections LAN (Local Area Network) 320A and wireless connections Wi-Fi 320B and/or other IoT radio connections.

Internet traffic falls into one of downstream from the Internet 340 to the home and upstream from the home to Internet 340. For the downstream traffic that the home router 310 has already received, it will be directly delivered onto the local and home connections. There is not much need for the traffic control by the home router 310 because the traffic has already been received and there is unlikely to be traffic congestion within the home network.

Therefore, the best place to apply the proposed traffic management system 300 should be on the upstream path at the WAN interface to the Internet 340, because there is always a bandwidth limit imposed by the service provider as to how much traffic the home router 310 can send to the Internet 340 via the WAN 330 interface. This limit is generally based on the service level agreement between the home user and the service provider. The traffic control at the entrance to the Internet 340 is far more effective than inappropriate control, which causes packets to be dropped in the network, wasting the network resources at the least.

Figure 4:
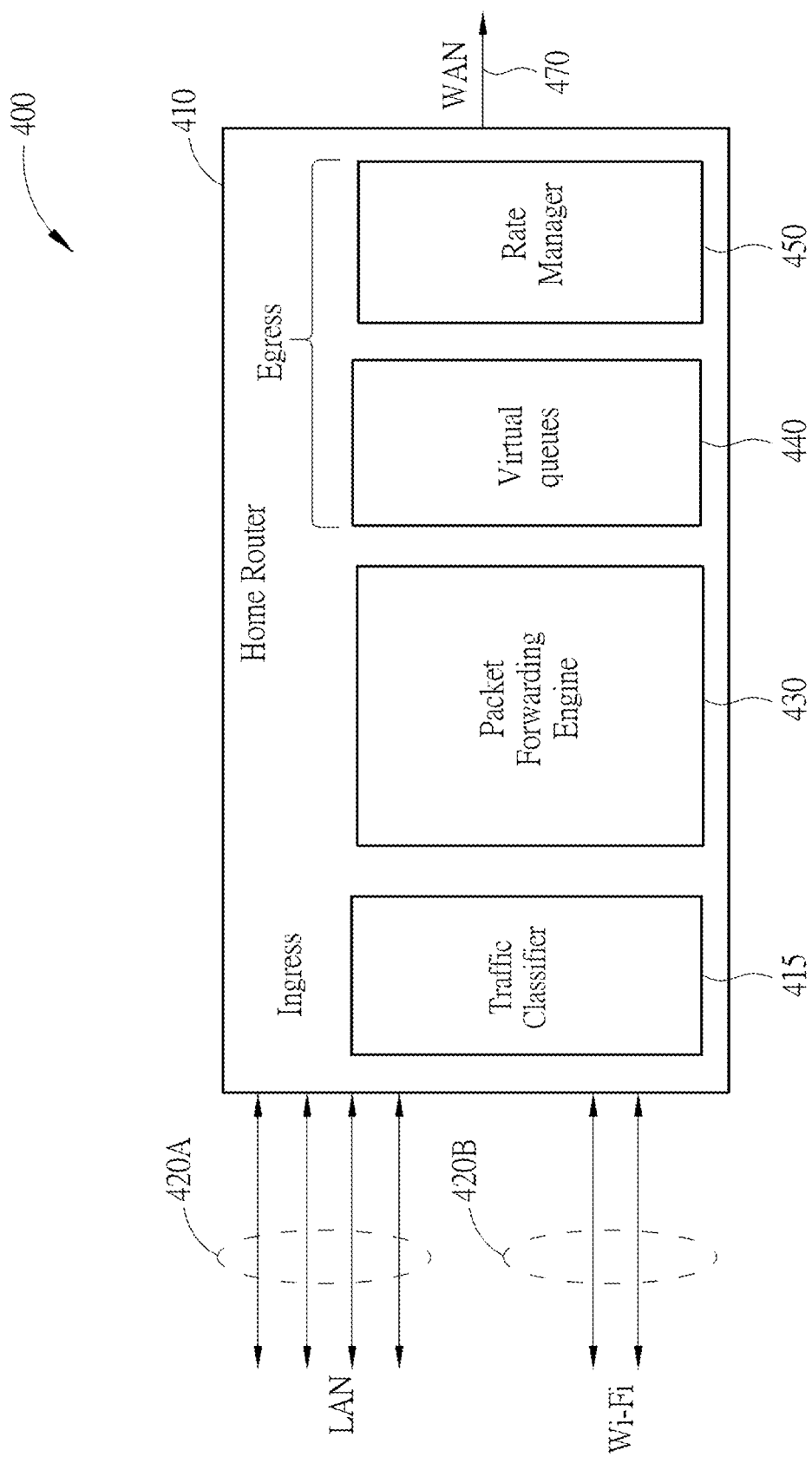
FIG. 4 shows major functional blocks for a home router to implement the application-aware rate management system and bandwidth control in the upstream path.

FIG. 4 shows major functional blocks for the home router to implement the application-aware rate management system 400 and bandwidth control in the upstream path. The traffic classifier 415 is similar to traffic classifier 210 previously described and is placed at the ingress interface to the home router 410 (similar to the router 210 in FIG. 3) because it can unequally apply to all incoming interfaces.

As shown in FIG. 4, The home router 410 includes the traffic classifier 415 coupled to a plurality of LAN 420A and Wi-Fi 420B interfaces on the Ingress side and virtual queues 440 (similar to virtual queues 220A and 220B in FIG. 2) coupled to rate manager 450 (similar to rate manager 230 of FIG. 2) on the Egress side that is coupled to a WAN interface 470, and a packet forwarding engine 430. The packet forwarding engine 430 is coupled between the Ingress and Egress portions of the router 410, preferably between the traffic classifier and the application virtual and default priority queues.

The classification result will be passed onto the egress interface internally. The egress interface is determined by the packet-forwarding engine.

A major advantage of the proposed data rate management system as described above is the quality service guarantee at the granularity of applications. The home user now has the capability to determine how much Internet bandwidth is allocated to an application, which greatly enhances the user experience accessing Internet and using other services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An application-aware control system implemented in customer-premises equipment comprising:
   a traffic classifier configured to classify inbound data traffic by a plurality of specific applications and determine which one of a plurality of virtual application queues data traffic originating from each specific application is to be stored in, wherein each virtual application queue is associated with only one of the plurality of specific applications and configured to store inbound data traffic classified by the traffic classifier as corresponding to the one specific application, wherein the traffic classifier is further configured to store inbound data traffic not classified as corresponding to any of the plurality of specific applications into one of a plurality of virtual default priority queues, based on priority values embedded in an Level 2 or Level 3 header; and
   a data rate manager configured to allocate at least one of outbound rate and/or bandwidth control for data packets stored in the virtual application queues and virtual default priority queues using application based traffic profiles.

2. The system of claim 1, wherein the specific applications are associated with at least one of a dynamic traffic flow, a physical port, a logical interface, a host computer, and/or a device.

3. The system of claim 1, wherein each specific application is assigned to a dedicated one of the plurality of virtual application queues.

4. The system of claim 1, wherein inbound data traffic through the traffic classifier with no match to one of the plurality of specific applications is stored in the virtual default priority queues based on packet original priority information.

5. The system of claim 1, wherein the application based traffic profiles comprise committed information rate and peak information rate.

6. The system of claim 1, wherein the data rate manager is further configured to output data packets stored in the virtual application queues and virtual default priority queues according to the allocated at least one of outbound rate and/or bandwidth control.

7. The system of claim 1, wherein the data rate manager is further configured to reallocate remaining bandwidth in proportion to the application based traffic profiles.

8. The system of claim 1, further comprising:
a packet forwarding engine coupled between the traffic classifier and the virtual application queues and virtual default priority queues.

9. The system of claim 1, wherein each virtual application queue is uniquely associated with one of the plurality of specific applications, and each virtual default priority queue is uniquely associated with the specific priority.

10. The system of claim 1, further comprising:
at least one local area network (LAN) port;
at least one Wi-Fi port; and
at least one wide area network (WAN) port;
wherein the traffic classifier is configured to classify the inbound data traffic from the LAN and/or Wi-Fi port by the plurality of specific applications;
wherein the data rate manager is coupled to the virtual application queues, the virtual default priority queues, and the WAN port.

11. The system of claim 10, wherein the data packets stored in the virtual application queues and the virtual default priority queues are output via the WAN port according to the allocated at least one of outbound rate and/or bandwidth control.

12. A control method in a communication system implemented in customer premises equipment, the method comprising:
classifying inbound data traffic by a plurality of specific applications to generate at least one classified inbound data traffic and at least one unclassified inbound data traffic;
determining which one of a plurality of virtual application queues data traffic originating from each specific application is to be stored in;
storing the at least one classified inbound data traffic into one of the plurality of virtual application queues, each virtual application queue associated with only a single one of the plurality of specific applications;
storing the at least one unclassified inbound data traffic into one of a plurality of virtual default priority queues, each virtual default priority queue is associated with a specific priority, based on priority values embedded in a Level 2 or Level 3 header;
allocating at least one of outbound rate and/or bandwidth control for data packets stored in the virtual application queues and virtual default priority queues using application based traffic profiles; and
outputting the data packets stored in the virtual application queues and virtual default priority queues according to the allocated at least one of outbound rate and/or bandwidth control.

13. The method of claim 12, wherein the plurality of specific applications are associated with at least one of a dynamic traffic flow, a physical port, a logical interface, a host computer, and/or a device.

14. The method of claim 12, wherein each specific application is assigned to a dedicated one of the plurality of virtual application queues.

15. The method of claim 12, further comprising storing the at least one unclassified inbound data traffic into one of the plurality of virtual default priority queues based on packet original priority information.

16. The method of claim 12, wherein the traffic profiles comprises committed information rate and peak information rate.

17. The method of claim 12, wherein the data packets stored in the virtual application queues and virtual default priority queues are output to Internet utilizing a WAN port according to the allocated at least one of outbound rate and/or bandwidth control.

18. The method of claim 12, further comprising:
reallocating remaining bandwidth in proportion to the application based traffic profiles.

* * * * *